(12) United States Patent
Anshits et al.

(10) Patent No.: US 6,472,579 B1
(45) Date of Patent: Oct. 29, 2002

(54) METHOD FOR SOLIDIFICATION OF RADIOACTIVE AND OTHER HAZARDOUS WASTE

(75) Inventors: Alexander G. Anshits, Krasnoyarsk (RU); Tatiana A. Vereshchagina, Krasnoyarsk (RU); Elena N. Voskresenskaya, Krasnoyarsk (RU); Eduard M. Kostin, Zheleznogorsk (RU); Vyacheslav F. Pavlov, Krasnoyarsk (RU); Yurii A. Revenko, Zheleznogorsk (RU); Alexander A. Tretyakov, Zheleznogorsk (RU); Olga M. Sharonova, Krasnoyarsk (RU); Albert S. Aloy, Saint-Petersburg (RU); Natalia V. Sapozhnikova, Saint-Petersburg (RU); Dieter A. Knecht, Idaho Falls, ID (US); Troy J. Tranter, Idaho Falls, ID (US); Yevgeny Macheret, Idaho Falls, ID (US)

(73) Assignee: The United States of America as represented by the Department of Energy, Washington, DC (US)

( * ) Notice: Subject to any disclaimer, the term of this patent is extended or adjusted under 35 U.S.C. 154(b) by 54 days.

(21) Appl. No.: 09/721,963

(22) Filed: Nov. 27, 2000

(51) Int. Cl.$^7$ .................................................. G21F 9/16
(52) U.S. Cl. .............................. 588/11; 588/2; 588/252
(58) Field of Search .................................... 588/1, 2, 3, 4, 588/11, 20, 249, 252

(56) References Cited

U.S. PATENT DOCUMENTS

| | | |
|---|---|---|
| RE25,564 E | 4/1964 | Alford et al. |
| 3,458,332 A | 7/1969 | Alford et al. ................ 106/52 |
| 3,888,691 A | 6/1975 | Villani et al. ............. 106/40 V |
| 4,016,299 A | 4/1977 | Tobin ........................... 264/63 |
| 4,035,545 A | 7/1977 | Ivanov et al. ................ 428/328 |
| 4,224,177 A | 9/1980 | Macedo et al. ......... 252/301.1 W |
| 4,312,774 A | 1/1982 | Macedo et al. .............. 252/629 |
| H200 H | 1/1987 | Chen .......................... 428/404 |
| 5,227,047 A | 7/1993 | Hwang ........................ 209/166 |

OTHER PUBLICATIONS

Nardova, A. et al., Proceedings of Int. Topical Mtg. on Nuclear and Hazardous Waste Management, *Spectrum '96*, Aug. 18–23, 1996, Seattle, WA (ANS 1996, p. 2154–2160).

(List continued on next page.)

*Primary Examiner*—Stanley S. Silverman
*Assistant Examiner*—Eileen E. Nave
(74) *Attorney, Agent, or Firm*—Virginia B. Caress; Paul A. Gottlieb (57) ABSTRACT

Solidification of liquid radioactive waste, and other hazardous wastes, is accomplished by the method of the invention by incorporating the waste into a porous glass crystalline molded block. The porous block is first loaded with the liquid waste and then dehydrated and exposed to thermal treatment at 50–1,000° C. The porous glass crystalline molded block consists of glass crystalline hollow microspheres separated from fly ash (cenospheres), resulting from incineration of fossil plant coals. In a preferred embodiment, the porous glass crystalline blocks are formed from perforated cenospheres of grain size −400+50, wherein the selected cenospheres are consolidated into the porous molded block with a binder, such as liquid silicate glass. The porous blocks are then subjected to repeated cycles of saturating with liquid waste, and drying, and after the last cycle the blocks are subjected to calcination to transform the dried salts to more stable oxides. Radioactive liquid waste can be further stabilized in the porous blocks by coating the internal surface of the block with metal oxides prior to adding the liquid waste, and by coating the outside of the block with a low-melting glass or a ceramic after the waste is loaded into the block.

24 Claims, 1 Drawing Sheet

OTHER PUBLICATIONS

Nardova, A. et al., Proceedings of Int. Topical Mtg. on Nuclear and Hazardous Waste Management, *Spectrum '96*, Aug.18–23, 1996, Seattle, WA (ANS 1996, pp. 2120–2122).

Zaharov, M. et al., *Inorganic Materials,* vol. 29,. #3, pp. 403–405 (1993).

Portnoi, K. et al., *Soviet Atomic Energy,* 14, #6, pp. 582–585 (1964).

Nikiforov, A. et al., *Soviet Atomic Energy,* v. 70, #3, pp. 245–249 (1991).

Aloy, A. et al., "Development and Testing of a New Porous Crystalline Matrix (Gubka) for Stabilizing Actinide Solutions" abstract for paper QQ21.3 published Nov. 28, 1999, in Meeting Abstracts Book for Materials Research Society meeting, Nov. 29–Dec. 3, 1999, Boston, MA.

Anshits, A. et al., *Catalysis Today,* 42, pp. 197–203 (1998).

Fomenko, E. et al., *Catalysis Today,* 42, pp. 267–272 (1998).

Fomenko, E. et al., *Catalysis Today,* 42, pp. 273–277 (1998).

FIG. 1

METHOD FOR SOLIDIFICATION OF RADIOACTIVE AND OTHER HAZARDOUS WASTE

The United States Government has certain rights in this invention including rights pursuant to contract DE-AC07-99ID13727 awarded by the U.S. Department of Energy.

BACKGROUND OF THE INVENTION

The invention is related to processing liquid radioactive waste and other hazardous liquid waste by means of its incorporation into a porous glass-ceramic block matrix. The invention can be applied, for example, in nuclear power engineering and defense production activities for solidification of liquid radioactive waste of various levels of radioactivity, including homogenous process solutions and heterogeneous finely dispersed sludge. It also can be used in the chemical and metallurgical industries for immobilization, transportation, decontamination and disposal of extremely hazardous liquid waste, containing heavy metals (Pb, As, Be, Ni, Cd, etc.)

The most common method for handling high-level radioactive waste (radwaste) is disposal of its solidified forms in deep geological formations with application of the multi-barrier principle for protection of the biosphere, in accordance with which, the confinement of the waste should be provided by several barriers. The primary barrier that ensures integrity of the high-level waste disposal system is provided by a high stability of the solidified waste form in groundwater, at high temperatures, and in radiation fields.

A promising method for production of stable solidified forms of high-level radwaste is considered to be incorporation of radionuclides into stable ceramic matrices with generation of man-made mineral-like compounds that have a low leach rate of radioactive components in water ($10^{-6}$–$10^{-7}$ g/cm$^2$×day). To accomplish this, liquid radioactive concentrates are exposed to evaporation and calcination, which produces thermal decomposition of the waste components subject to radiolysis (e.g., nitrates), followed by sintering or hot pressing of the calcined products with various additives.

It is a challenge to solidify liquid radwaste because the radioactive components have to be evenly distributed in the matrix structure. One solution to this problem is to use porous ceramic materials with a homogenous porous structure and a large share of free available volume. The loading of such porous material with radioactive waste solutions and further steps of moisture removal by evaporation and salt calcination in the pores make it possible to achieve homogenous distribution and immobilization of radionuclides in the matrix volume. The known radioactive waste solidification methods, using such porous materials, primarily include the use of microporous adsorbents, for example zeolites and silica gel, as well as foam corundum, porous fireclay (chamotte), diatomite clays, and porous silicate glasses which, after being loaded with radionuclides, are mixed as sludge with various solidifiers or are exposed to hot pressing, melting, or calcination. The weakness of those methods is that their applications are limited since they cannot be used for all liquid radioactive waste compositions and activity levels. Beyond that, these microporous materials are not capable of functioning over a long period of time with actual liquid waste compositions containing suspensions and non-radioactive salt macrocomponents because the suspensions and salt macrocomponents tend to clog the pores, thereby decreasing the loading capability of the solid adsorbents. It is also important to note that it is very difficult to achieve complete dehydration of these microporous materials because it would require temperatures in the range of 500° C. and most microporous materials are unstable at these temperatures in the acid media which is often typical of liquid radwaste. Also, these matrices are saturated with the waste components only at solution boiling temperatures, and heating at the boiling point is necessary to dry the solid. This is undesirable because of the potential for radionuclide aerosol formation during the drying process.

One known method for treatment of radwaste to remove radionuclides requires dripping liquid radioactive waste through a sorbent installed in a filter. The filter is filled with a porous matrix to be treated to generate the sorbent in the form of a porous molded block. The liquid radioactive waste first goes through the central zone of the filter and then through the periphery zone, and, ultimately, the spent sorbent is sent to disposal with the filter. Granulated silica gel has been proposed to be used as a material for the porous molded block, mixed with an inorganic pseudoboehmite-based binder, porous sodium silicate glass and porous iron. One of the disadvantages of this process is a high leach rate of radionuclides from the porous molded block ($\geq 10^{-3}$ g/cm$^2$×days), which makes it unsuitable for long-term disposal. Furthermore, this process does not completely solve the problem of improving the environmental situation at a nuclear facility since it implies additional treatment of the filtrates with a high salt content (up to 320 g/l). Therefore, there is a need for an effective processing method of removal and solidification of radwaste and other hazardous material, wherein the stability of the solidified form is increased.

SUMMARY OF THE INVENTION

Solidification of liquid radioactive waste, and other hazardous wastes, is accomplished by the method of the invention whereby the waste is incorporated into a porous molded glass crystalline block which is first loaded with liquid waste and then dehydrated and exposed to thermal treatment at 50–1,000° C. The porous molded glass crystalline block consists of glass crystalline hollow microspheres separated from fly ash (cenospheres), resulting from incineration of fossil plant coals. In one embodiment, porous glass crystalline blocks are formed from cenospheres of a particular desired composition, wherein the selected cenospheres are consolidated into a porous molded block with a binder, such as liquid silicate glass. The porous blocks are then subjected to repeated cycles of saturating with liquid radioactive wastes, and drying, and after the last cycle the blocks are subjected to calcination to transform the dried salts to more stable oxides.

DETAILED DESCRIPTION OF THE INVENTION

The porous glass crystalline blocks of the invention, molded from glass crystalline hollow microspheres (specifically cenospheres), are characterized by high values of open-cell porosity of about 40 vol. % up to about 90 vol. %, a homogenous porous structure, significant interglobular pore sizes (voids) in the range of 20–100 micrometers, thermal stability and high stability in most acids, which makes it possible to provide very effective solidification of waste in a wide range of pH, temperatures and radionuclide compositions. It is believed that the concentration, solidification and immobilization of radionuclides and the mineral component of radioactive and other hazardous waste in porous glass crystalline blocks are made possible due to the following functional processes:

- Absorption of solutions into the block volume by means of capillary forces and high wetting capability of the internal surface;
- Water evaporation and its intensive release with the aid of a dry carrier gas at low temperatures (about 25° C.–60° C.), by static heating in a conventional furnace, by hot air heating in an oven, or by microwave heating.
- Repeated absorption of the waste solution with a low salt content to achieve the required loading capacity;
- Binding of radionuclides and other hazardous wastes by incorporating stable oxides with a high specific surface into the block;
- Complete decomposition of salts directly in the internal voids of the block at temperatures which are lower than the melting point of the block material;
- Reliable immobilization of radionuclides and other hazardous wastes, as well as their associated salts, inside the block at the final stage of the process by calcination of the saturated glass-ceramic matrix;
- Further consolidation of the blocks containing the oxides at high temperatures and high pressures;
- Further encapsulation of the blocks with glass or ceramic coating.

In the embodiment of the invention useful for liquid radioactive waste solidification, it is possible to microencapsulate radionuclides in glass crystalline blocks formed from microspheres. The radionuclides are microencapsulated in internal cavities of the microspheres as well as in the interglobular voids between the microspheres. The hollow microspheres, obtained from fly ash and known as cenospheres, are separated according to their size, bulk density and magnetic properties.

The properties of these porous glass crystalline blocks make it possible to provide especially reliable immobilization of long-lived radionuclides with significant minimization of liquid waste volume that, depending on the salt content, can reach 1:40 ratio of solid to liquid. Compared to known processes, an advantage of the use of the porous glass-ceramic blocks made of glass crystalline cenospheres in this invention is their thermal stability and high stability in most acids, thereby making it possible to use with waste in a wide range of pH, temperatures and radionuclide compositions.

The cenospheres used to prepare the glass crystalline blocks used for this invention were obtained from fly ash from several power plants in Russia. For an example of the composition of the cenospheres, the following data are for the magnetic and non-magnetic cenospheres from the Novosibirskaya power plant:

The following ranges of composition for magnetic and non-magnetic products accordingly are respectively as follows: $SiO_2$—58.0–61.0 wt. % and 64.9–66.3 wt. %; $Al_2O_3$— 18.2–20.4 wt. % and 20.1–21.1 wt. %; $Fe_2O_3$— 9.7–12.3 wt. % and 3.1–4.6 wt. %; MgO—1.4–3.0 wt. % and 1.9–2.2 wt. %; CaO—2.3–3.8 wt. % and 1.8–2.7 wt. %; $Na_2O$—0.4–1.3 wt. % and 0.3–0.6 wt. %; $K_2O$—1.8–2.7 wt. % and 1.9–2.9 wt. %; $TiO_2$—0.3–0.8 wt. % and 0.2–0.5 wt. %.

The porous glass crystalline material of high open-cell porosity used in the invention is characterized by two types of openings, interglobular voids (voids between cenospheres) and through-flow wall pores or perforations in the cenosphere walls. This material and the methods of making it are described in greater detail in U.S. patent application Ser. No. 09/721,962, filed on Nov. 27, 2000, which is incorporated herein by reference. In summary, the material is produced by separating and selecting cenospheres of fixed sizes and composition, molding the cenospheres and agglomerating the cenosphere array under sintering conditions. The cenospheres are sintered to each other at their points of contact either with or without a binder. The separation steps include a density separation step to remove the broken cenospheres and accessory particles such as unburned carbon material, and one or more of the following steps, depending on the required parameters of the product, performed in any order: dry magnetic separation, separation by grain size, gravity concentration (which is separation by density) and recovery of perforated and non-perforated cenospheres. However, to achieve the maximum open-cell porosity of 90 vol %, the gravity concentration step is always required in order to separate and use the least dense cenospheres. To enhance the interglobular void of the sintered cenosphere array and to obtain openings of a predicted size, the cenospheres having diameters in a narrow range of values are preferable. The lightest fraction with an accessible interglobular void produced total open-cell porosity up to 90 vol. %, which is as high as porosity of the cellular porous bodies. It is also desirable to have through-flow pores in the cenosphere walls (the perforated cenospheres), which make the internal void of cenospheres accessible.

In one preferred embodiment for making the glass crystalline blocks the cenospheres are separated into size groups, into perforated and non-perforated, and into magnetic and non-magnetic. The non-perforated non-magnetic cenospheres of size −400+50 micrometers (greater than 50 but less than 400 micrometers) are selected and mixed with a wetting agent, such as water, and a binder, such as a liquid silicate glass, in a weight ratio of cenospheres:wetting agent:binder of about 1:(0.012–0.29):(0.18), followed by compaction of the obtained plastic mixture in a press form to reduce the mixture volume by 10–20%. The molded blocks are dried at 160° C. for 2 hours and sintered for 0.5–1 hour at a temperature above 800° C. but below the softening temperature of the cenospheres. (Glasses are characterized by a melting temperature range: the lower limit of this range is the softening temperature and the high limit of the range is the liquidity temperature. The liquidity temperature for non-magnetic cenospheres of Novosibirskaya power plant is about 1400° C. and the softening temperature is about 1100° C. However, these temperature values depend on the cenosphere composition and, consequently, on the power plant). The same process can be used starting with only perforated cenospheres, or a mixture of perforated and non-perforated cenospheres.

In another preferred embodiment, the non-perforated cenospheres are placed in a refractory mold of a predetermined shape and the mold is placed in a muffle and held at a sintering temperature below the liquidity temperature for 20–60 minutes. The sintering causes most of the non-perforated cenospheres to become perforated. However, to cause additional perforation, the cenosphere agglomerate can be treated with acid to perforate further the cenospheres. The acid reagents are selected from the group consisting of 3–6 M hydrochloric acid; $NH_4F$—$HF$—$H_2O$ with content of $F^-$ about 15–30 gram-ions per liter at a molar ratio $NH_4F/HF$ of about 0.1–1.0; and $NH_4F$—$HCl$—$H_2O$ with content of $F^-$ about 1–10 gram-ions per liter at a molar ratio $F^-/Cl^-$ of about 0.1–1.0.

The cenospheres used in this invention generally have a diameter in the range of 40–800 micrometers, preferably in the range of 50–400 micrometers, a softening temperature above about 1000° C., a temperature of liquidity about 1400° C., and a bulk density above about 0.25 g/cm$^3$. The resulting porous material is characterized by open-cell porosity in the range of 40–90 vol. %, interglobular openings in the range of 20–100 micrometers, through-flow wall pore size of 0.1–30 micrometers, an apparent density in the range of 0.3–0.6 g/cm$^3$ and a compressive strength in the range of 1.2–3.5 MPa..

The invention is illustrated by the following non-limiting examples. The porous crystalline blocks used in these examples were made by two of the processes disclosed in U.S. patent application Ser. No. 09/721,962, referenced previously. The two methods of block preparation used were as follows:

(a) Separation of cenospheres by magnetic properties, and separation of the non-magnetic product by size. This process was applied to make the porous blocks of 40–50 vol. % open-cell porosity used in examples 1–5:

About 100 g of cenospheres from Novosibirskaya power plant were separated into magnetic and non-magnetic products by applying a magnetic field. After that, the non-magnetic product was classified by grain sizes selecting a fraction of –200+50 micrometers for examples 1 and 2, and –400+50 for examples 3, 4 and 5. 75 g of the selected cenospheres were mixed with 13.5 g of a liquid silicate glass and 15 ml of water. The plastic mixture by portions was compacted by one-side pressing in cylinder molds of 16 mm in diameter (the diameter can be, 35, 40 and 56 mm—it depends on the size of the sample) to reduce the mixture volume by up to 20%. The formed block was removed from the mold and dried in an oven at 160° C. for 1 hour. After drying, the block was placed in a muffle on a ceramic support and sintered by heating from room temperature to 850° C. at about 10° C./min and holding at 850° C. for 0.5 hour. Thereafter, the furnace was switched off and allowed to cool prior to removing the block.

(b) Separation of cenospheres by magnetic properties, separation of the non-magnetic product by size, and separation by perforation. This process was applied to make the porous blocks of 40–70 vol. % open-cell porosity used in examples 6–9:

About 800 g of cenospheres from Novosibirskaya power plant were separated into magnetic and non-magnetic products by applying a magnetic field. After that, about 500 g of the non-magnetic product was classified by grain sizes selecting a fraction of –400+50 micrometers (about 450 g), and another part of the non-magnetic product (about 260 g) was classified by grain sizes selecting a fraction of –160+100 micrometers (about 100 g) and of –400+200 micrometers (about 60 g). Every fraction was then packed in a textile bag and subsequently placed into a glass vessel which was pumped down by a water jet pump to 8.0 kPa and kept at the reduced pressure for 20–30 minutes. Then the vessels containing the cenospheres were filled with water by suction and left for 20–30 minutes until degassing was completed. The cenospheres were held under the water layer by a metallic net. After this procedure, the pressure in the vessels was returned to atmospheric pressure resulting in the injection of water into the cavities of perforated cenospheres. The wet cenospheres were removed from the textile bag and placed in a glass beaker with water so that the cenospheres separated into a floating layer (non-perforated product) and a sinking layer (perforated product). The layers were drained in a Buechner funnel and dried at 110–150° C. The output of different products was as follows:

|  | –400 + 50 micrometers | –160 + 100 micrometers | –400 + 200 micrometers |
| --- | --- | --- | --- |
| perforated | 50 g | 25 g | 15 g |
| non-perforated | 400 g | 75 g | 45 g |

50 g of the selected perforated cenospheres of –400+50 microns were mixed with 9 g of a liquid silicate glass and 10 ml of water. 75 g of the selected non-perforated cenospheres of –160+100 microns were mixed with 13.5 g of a liquid silicate glass and 15 ml of water. 45 g of the selected non-perforated cenospheres of –400+200 micrometers were mixed with 8 g. of a liquid silicate glass and 9 ml. of water. The plastic mixtures by portions were compacted by one-side pressing in cylinder molds of 16 mm in diameter (for –400+50 and –160+100 micrometers) and in cone molds of 35×40 mm in diameter (for cenospheres of –400+200 micrometers) to reduce the mixture volume by up to 20%. The blocks formed from perforated and non-perforated cenospheres respectively were removed from the molds and dried in an oven at 160° C. for 1 hour. After drying, the blocks were placed in a muffle on a ceramic support and sintered by heating from room temperature to 850° C. at about 10° C./min and holding at 850° C. for 0.5 hour. Thereafter, the furnace was switched off and allowed to cool prior to removing the block. The average open-cell porosity of the blocks is 40–50 vol. % and 60–70 vol. % for the non-perforated and perforated blocks, respectively.

EXAMPLE 1

A simulant for the raffinate of the first extraction cycle of a typical spent nuclear fuel reprocessing operation is used, having the following composition: $HNO_3$, g/l: 30; Fe (3), g/l: 20; Cr (3), g/l: 15; Ni, g/l: 15; Pu, mg/l: 15.

The porous block that was used for this experiment consisted of glass crystalline microspheres recovered from fly ash, resulting from Kuznetskii (Russia) coal incineration, with the following properties:

| Shape: | cylindrical |
|---|---|
| Mass, g | 25.2 |
| Diameter, mm | 56.0 |
| Height, mm | 24.0 |
| Apparent density, g/cm$^2$ | 0.43 |
| Total moisture retention capacity, g/g | 0.93 |
| Total open-cell porosity, vol.% | 40.0 |
| Chemical composition of the matrix, wt %: | |
| $SiO_2$ | 65.5 |
| $Al_2O_3$ | 20.3 |
| $Fe_2O_3$ | 3.9 |
| CaO | 2.6 |
| MgO | 2.2 |
| $SO_3$ | 0.74 |
| Other | 0.7 |

150 ml of the simulated solution was added to the porous glass crystalline block by multiple loading cycles alternating with drying in an oven at about 50–150° C. for approximately 120 minutes. Each loading/drying cycle was carried out by saturation of the block with liquid solution by absorption of about 20 ml, followed by drying. About 8 cycles were required to load the block with salt components of the solution. After the final drying stage, the block saturated with the salts was calcined in the muffle furnace at 800° C. for 120 minutes. No encapsulation of the block was performed. The Pu immobilization reliability in the porous glass crystalline compound without the encapsulation shell has been tested in accordance with the procedure described in GOST 29114-91 (a well-known state standard procedure used in Russia for the leaching measurement of solidified radioactive waste).

The following results were obtained:

Degree of loading the block with the waste oxides, %:

42.2

Pu content in the block, mg:

2.3

Pu average leach rate in water during 93 days, g/cm$^2$× days:

5.9×10$^{-6}$

EXAMPLE 2

For solidification the simulant for the raffinate of the first extraction cycle of a typical spent nuclear fuel reprocessing operation is used, as in Example 1, wherein the Pu content is 43 mg/l.

The chemical composition of the porous glass crystalline block subject to loading is identical to that used in Example 1. The properties of the block are as follows:

| Shape | cylindrical |
|---|---|
| Mass, g | 25.0 |
| Diameter, mm | 56.0 |
| Height, mm | 24.0 |
| Apparent density, g/cm$^2$ | 0.44 |
| Total moisture retention capacity, g/g | 1.10 |
| Total open-cell porosity, vol. % | 51.0 |

150 ml of the simulated solution was added into the block by multiple loading cycles, alternating with drying in an oven at about 50–150° C. for 120 minutes. After the final stage of dehydration, the block saturated with salts was calcined in the muffle furnace at 800° C. for 120 minutes. Then the block was coated with low-melting glass with the following properties:

| Softening point, ° C.: | 352 |
|---|---|
| Coefficient of linear expansion, degree$^{-1}$: | 1.03 × 10$^{-5}$ |
| Chemical composition: | |
| $B_2O_3$, mass %: | 16.0 |
| PbO, mass %: | 80.0 |
| ZnO, mass %: | 4.0 |

Reliability of Pu immobilization in the glass-ceramic compound has been tested in accordance with the procedure as described above in Ex. 1. The following results were obtained:

| Degree of loading the block with the waste oxides, %: | 44.7 |
|---|---|
| Pu content in the block, mg | 6.5 |
| Pu average leach rate in water during 93 days, g/cm$^2$ × days: | 2.5 × 10$^{-7}$ |

EXAMPLE 3

For solidification, the liquid radioactive waste simulants, such as solutions of $NaNO_3$, $CsNO_3$ and $SrNO_3$ with a concentration of 100 g/l, have been used. The simulants have been loaded into the cylindrical glass crystalline porous blocks made of cenospheres. The characteristics of these blocks are given in Table 1.

The loading of the simulated solutions alternated with active ventilation of the loaded blocks at room temperature by dry air, and moisture condensation from the saturated air. Then the blocks were dehydrated for 120 minutes at 150° C., and were calcined in the muffle furnace at 850° C. No encapsulation of the blocks was performed.

The reliability of Na, Cs and Sr immobilization in the glass-ceramic compound was tested in accordance with the procedure as described above in Ex. 1. The results obtained are given in Table 1.

TABLE 1

Characteristics of the Loaded Glass-Ceramic Compounds Without Encapsulation Shell

| # | Mass of the initial block, g | Diameter, mm | Height, mm | Moisture retention capacity, g/g | Porosity, vol. % before loading | Degree of loading, wt. % | Average leach rate, g/cm$^2$ × days |
|---|---|---|---|---|---|---|---|
| | | | | NaNO$_3$ | | | |
| 1 | 1.30 | 16 | 14 | 0.79 | 42 | 7.0 | 3.1 × 10$^{-5}$ |
| 2 | 1.32 | 16 | 15 | 0.76 | 38 | 10.3 | 2.4 × 10$^{-5}$ |
| | | | | CsNO$_3$ | | | |
| 3 | 1.27 | 16 | 14 | 0.71 | 36 | 7.7 | 1.6 × 10$^{-5}$ |
| 4 | 1.27 | 16 | 15 | 0.79 | 38 | 14.4 | 5.1 × 10$^{-5}$ |
| | | | | Sr(NO$_3$)$_2$ | | | |
| 5 | 1.34 | 16 | 15 | 0.75 | 38 | 2.6 | 6.0 × 10$^{-5}$ |
| 6 | 1.23 | 16 | 14 | 0.73 | 36 | 5.2 | 1.5 × 10$^{-4}$ |

EXAMPLE 4

The blocks were loaded with liquid radioactive waste simulants, as in Example 3. After calcination, the blocks were coated with a ceramic layer of the following composition (in wt. %):

SiO$_2$:
55.5
Al$_2$O$_3$:
6.4
CaO:
28.5
MgO:
9.3
TiO$_2$:
0.3

The reliability of Na, Cs and Sr immobilization in the glass-ceramic compound was tested in accordance with the procedure as described above in Ex. 1. The results obtained are given in Table 2.

TABLE 2

Characteristics of Encapsulated Glass-Ceramic Compounds

| # | Mass of the initial block, g | Diameter, mm | Height, mm | Moisture retention capacity, g/g | Porosity, vol. % before loading | Degree of loading, wt. % | Average leach rate, g/cm$^2$ × days |
|---|---|---|---|---|---|---|---|
| | | | | NaNO$_3$ | | | |
| 1 | 1.24 | 16 | 14 | 0.80 | 40 | 11.0 | 2.0 × 10$^{-6}$ |
| | | | | CsNO$_3$ | | | |
| 2 | 1.40 | 16 | 14 | 0.76 | 37 | 7.7 | 1.6 × 10$^{-6}$ |
| | | | | Sr(NO$_3$)$_2$ | | | |
| 3 | 1.30 | 16 | 14 | 0.79 | 42 | 8.0 | 1.2 × 10$^{-6}$ |

EXAMPLE 5

The solidification of liquid radioactive waste simulants is performed as in Example 3 wherein with the application of Sr(NO$_3$)$_2$ solution, prior to solidification, the internal surface of the porous glass crystalline ceramic block is coated with a metal oxide, selected from ZrO$_2$, TiO$_2$, Fe$_2$O$_3$ or Al$_2$O$_3$, in the amount of 15–30 wt. %. The final calcination of the blocks saturated with SrO is performed at 1,000° C. After calcination, all the blocks contain 2.8–3.0 wt. % of SrO. No encapsulation of the generated glass-ceramic compounds was performed. The properties of the solidified products are shown in Table 3.

TABLE 3

Characteristics of Glass-Ceramic Compounds Without Encapsulation Shell

| # | Mass of the initial block, g | Diameter, mm | Height, mm | Moisture retention capacity, g/g | Porosity, vol. % before loading | Degree of loading, wt. % | Average Sr leach rate, g/cm$^2$ × days |
|---|---|---|---|---|---|---|---|
| | | | | $ZrO_2$ | | | |
| 1 | 1.31 | 16 | 14 | 0.78 | 41 | 15.0 | $2.1 \times 10^{-6}$ |
| 2 | 1.32 | 16 | 15 | 0.77 | 39 | 29.5 | $2.3 \times 10^{-6}$ |
| | | | | $TiO_2$ | | | |
| 3 | 1.26 | 16 | 14 | 0.76 | 36 | 15.5 | $2.6 \times 10^{-6}$ |
| 4 | 1.27 | 16 | 15 | 0.77 | 38 | 29.8 | $3.1 \times 10^{-6}$ |
| | | | | $Fe_2O_3$ | | | |
| 5 | 1.35 | 16 | 15 | 0.79 | 43 | 14.9 | $4.0 \times 10^{-5}$ |
| 6 | 1.26 | 16 | 14 | 0.75 | 35 | 30.0 | $3.5 \times 10^{-5}$ |
| | | | | $Al_2O_3$ | | | |
| 7 | 1.40 | 16 | 14 | 0.80 | 41 | 15.2 | $4.5 \times 10^{-6}$ |
| 8 | 1.38 | 16 | 15 | 0.76 | 36 | 30.1 | $3.4 \times 10^{-6}$ |

The compounds described in Examples 1, 3 and 5 show that the solidified glass-ceramic compounds immobilize radionuclides fairly well even without the encapsulation shell. The average leach rates for Cs rates from the non-encapsulated samples reach $(1.6–5.1) \times 10^{-5}$ g/cm$^2$×days, and for Sr $(2.1 \times 10^{-6}$ g/cm$^2$×days$) – (1.5 \times 10^{-4}$ g/cm$^2$×days$)$, while the Pu leach rate is $5.9 \times 10^{-6}$ g/cm$^2$×days. These leach rates are higher than in previous tests disclosed in Russian patent application RF#2091874, but lower than in the Russian High-Level Solidified Waste, Technical Requirements State Standard P 509226-96.

Packing the porous glass crystalline ceramic blocks into ceramic or glass-like shells, as well as incorporation of 15–30 wt. % of microencapsulated oxide additives ($ZrO_2$, $TiO_2$ and $Al_2O_3$) into the block composition, increase the stability of the solidified products and reduce their leach rates down to the levels allowable for long-term disposal of high-level solidified waste (about $10^{-6}$ g/cm$^2$×days for Sr and Cs, and $2.5 \times 10^{-7}$ g/cm$^2$×days for Pu). The non-encapsulated solidified glass-ceramic compounds, including the blocks with $Fe_2O_3$, can be used for interim storage or radioactive waste, including its transportation to the site of its further treatment.

EXAMPLE 6

Two simulated actinide waste solutions, designated dilute actinide/lanthanide solution and actinide solution filtrate, were used to perform waste loading tests on porous glass crystalline ceramic blocks. The blocks used for the experiments in examples 6–9 consisted of non-perforated and perforated, non-magnetic, glass crystalline cenospheres recovered from coal incineration fly ash as described above in the method of block preparation (b). The elemental concentrations in the simulant solutions were:

| Dilute Actinide/Lanthanide Solution (all in 0.5 $\underline{M}$ HNO$_3$) | Simulated Actinide Solution Filtrate (all in ≈0.7 $\underline{M}$ HNO$_3$/HCl) |
|---|---|
| 0.9850 g/L La | 3.507 g/L Al |
| 0.7740 g/L Ce | 0.6008 g/L Ca |
| 0.6611 g/L Pr | 32.0 g/L Ce |
| 1.8992 g/L Nd | 0.7513 g/L Cr |
| 0.0910 g/L Bu | 15.70 g/L Fe |
| 0.2320 g/L Gd | 0.4797 g/L Mg |
| 1.0615 g/L Fr | 0.5101 g/L Ni |
| 1.0940 g/L Al | 6.510 g/L K |
| 0.2426 g/L Mn | 11.72 g/L Na |
| 0.2170 g/L K | |
| 0.0211 g/L Zn | |
| 0.0660 g/L Ca | |
| 5.5543 g/L Fe | |
| 0.5490 g/L Na | |
| 0.0041 g/L Zr | |
| 0.4498 g/L Sm | |

Aliquots of the dilute actinide/lanthanide simulant were added to the blocks made from the non-perforated cenospheres by multiple loading cycles, alternating with drying at 100–130° C. for 2 hours in a tube furnace with carrier gas (air) flow at approximately 0.1 m/s. The blocks made from perforated cenospheres were loaded under vacuum with the actinide solution filtrate simulant by multiple loading cycles, alternating with drying in a tube furnace under the same conditions as the blocks made from non-perforated cenospheres. After the final drying stage, the blocks saturated with the salts were weighed to determine the total salt up-take as a percent of the total mass. Block characteristics and results are listed in Table 4.

The results of Table 4 show that the salt mass loading of the blocks with perforated cenospheres is roughly 50% and that it is approximately twice that of the non-perforated samples. This is expected since the perforated cenospheres allow deposition inside the cenosphere as well as in the inter-globular voids between cenospheres.

EXAMPLE 7

In this test, porous glass crystalline blocks of the perforated cenosphere type were loaded under vacuum with the dilute lanthanide and actinide solution filtrate simulants similar to those of the previous example. However, in this test, the drying between loading cycles was done by placing the sample in a microwave oven to decrease drying times. After the last drying cycle, the blocks were weighed to determine the total salt up-take as a percent of the total mass. Block characteristics and results are listed in Table 5.

Table 5 shows that the drying times were significantly decreased using the microwave drying technique. Salt loadings for blocks 82-pc and 73-pc were similar to the previous example in the 40 to 50 wt. % range. Loadings for blocks 81-pc and 96-pc were lower because these blocks were loaded with a more dilute solution and the test was terminated before total saturation was reached.

EXAMPLE 8

Figure 1:
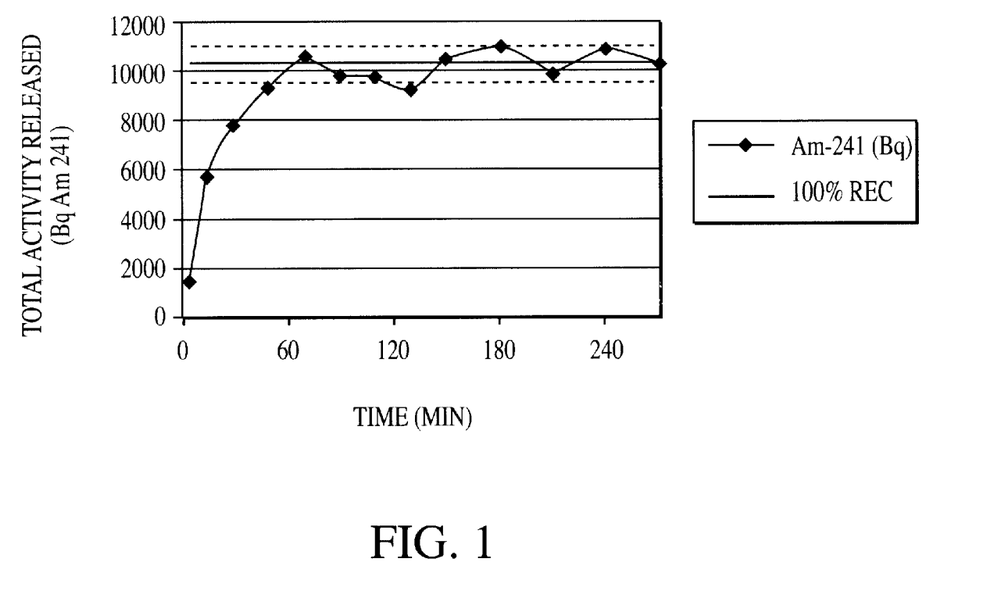
The FIGURE is a graph of a kinetic release test of a molded porous block of the invention, loaded with Am-241, in 6 M HNO$_3$ at 60° C.

This recovery experiment was performed to determine if deposited salts could be leached or recovered from a previously loaded block after calcination of the block. These data are important in the application where a block might be used as a transport medium for radioactive metals to be recovered at a different location and concentrated or placed in a different waste form. The porous glass crystalline block used for the experiment consisted of non-perforated glass crystalline cenospheres that had been previously saturated with the dilute actinide/lanthanide simulant listed in Example 6, by multiple loading and drying cycles. In this case, an Am-241 tracer was also added to the simulant to facilitate kinetic release measurements by gamma spectroscopy. The loaded block was suspended in 6 M $HNO_3$ at 60° C. with constant stirring and small aliquots of the acid solution were removed over time to obtain a kinetic release curve. The results of this test are shown in the figure. These data show that the release is essentially complete after 1 hour of contact time.

EXAMPLE 9

The blocks of glass crystalline porous material made by sintering non-perforated non-magnetic cenospheres of 100–160 micrometers in diameter with the silicate binder (samples #161-54, #161-56 and #161-58) were loaded with components of another simulated actinide solution spiked by plutonium (Table 6). Cerium nitrate doped with Pu-239 was used as a simulant for plutonium.

TABLE 6

Composition of simulated actinide solution in 7 M $HNO_3$

| Component | Concentration, g/l |
|---|---|
| $Ce(NO_3)_3$ | 66.0 |
| $UO_2(NO_3)_2$ | 23.0 |
| $KNO_3$ | 13.0 |
| $Mg(NO_3)_2$ | 7.0 |
| Pu-239 Activity | 72500 ± 4500 Bq/ml |
| Am-241 Activity | 2785 ± 150 Bq/ml |

Saturation was performed for 5 cycles with oven drying at 130° C. after each cycle for 1 hour followed by calcination at 800° C. for 0.5 hour. Under these conditions the loading of blocks with oxides was about 20 wt. %. Two loaded blocks were compacted using hot uniaxial pressing (HUP) under the following parameters:

Pressure: 300 kg/cm² (29.4 MPa);

Temperature: 900° C.;

Time: 0.5 hour;

Temperature at pressure release: 400° C.

The hot-pressed samples were tested by their durability at 90° C. in distilled water during 100 days according to the Material Characterization Center MCC-1 test. Parameters of Pu-containing samples and leaching rates are presented in Tables 7 and 8.

TABLE 7

Parameters of Pu-containing samples

| Sample | Mass, g | Diameter, cm | Height, cm | Surface, cm² | Activity, kBq Pu-239 | Am-241 |
|---|---|---|---|---|---|---|
| Calcined | 1.47 | 1.60 | 1.45 | 17.33 | 315 | 12 |
| Hot Pressed | 3.00 | 1.60 | 0.60 | 13.06 | 630 | 24 |

TABLE 8

The leachate specific activity and leaching rates of Pu-239 and Am-241 from the hot pressed samples loaded with metal oxides of simulated actinide solution

| Sample | Leaching time, day | Leachate specific activity, Bq/ml Pu-239 | Am-241 | Leaching rate, g/cm² · day Pu-239 | Am-241 |
|---|---|---|---|---|---|
| Hot Pressed | 7 | <10 | 0.0083 ± 0.0037 | <2 × 10⁻⁵ | 0.5 × 10⁻⁶ |
| Hot pressed | 14 | <10 | 0.0042 ± 0.0033 | <2 × 10⁻⁵ | 0.2 × 10⁻⁶ |
| Hot pressed | 28 | <10 | 0.0125 ± 0.0030 | <1 × 10⁻⁵ | 0.3 × 10⁻⁶ |
| Hot pressed | 100 | <10 | 0.075 ± 0.0080 | <1 × 10⁻⁵ | 0.1 × 10⁻⁶ |

The data show that the final waste form obtained as a result of hot pressing procedure is a stable glass-ceramic material with low Pu release rates.

Other modifications and variations of the above present invention are possible in the light of the above teaching. The changes may be made in the particular embodiments of the invention as defined by the appended claims.

We claim:

1. A method for solidification of liquid waste, said liquid waste being at least one selected from the group consisting of liquid radioactive waste and liquid hazardous non-radioactive waste, by means of incorporating said liquid waste into a porous glass crystalline molded block, comprising:

providing a porous glass crystalline molded block made from cenospheres obtained from fly ash, wherein said porous glass crystalline molded block has an open-cell porosity of about 40–90 vol. %;

loading said porous glass crystalline molded block with said liquid waste;

drying the porous glass crystalline molded block loaded with said liquid waste; and calcining the dried porous glass crystalline molded block loaded with said liquid waste.

2. The method of claim 1 wherein said loading of said porous glass crystalline molded block with said liquid waste and said drying are repeated multiple times, and said loading is alternated with said drying.

3. The method of claim 2 wherein said drying comprises active ventilation of said loaded porous glass crystalline molded block with dry air at room temperature, and moisture condensation from resulting saturated air.

4. The method of claim 2 wherein said drying comprises microwave heating.

5. The method of claim 2 wherein said drying comprises heating in an oven.

6. The method of claim 2 further comprising coating the calcined porous glass crystalline molded block loaded with said liquid waste with a low-melting glass or a ceramic coating, after said calcining.

7. The method of claim 2 wherein said drying is carried out at about 50–150° C. for about 120 minutes.

8. The method of claim 2 wherein said calcining is carried out at about 800° C. for about 120 minutes.

9. The method of claim 1 further comprising coating internal surfaces of said porous glass crystalline molded block with a metal oxide, prior to said loading with said waste.

10. The method of claim 9 wherein said metal oxide is at least one selected from the group consisting of $ZrO_2$, $TiO_2$, $Fe_2O_3$ and $Al_2O_3$.

11. The method of claim 10 wherein said calcining is carried out at 1,000° C.

12. The method of claim 1 wherein said cenospheres in said porous glass crystalline molded block are non-perforated cenospheres.

13. The method of claim 1 wherein said cenospheres in said porous glass crystalline molded block are perforated cenospheres.

14. The method of claim 1 wherein said liquid radioactive waste comprises a first cycle raffinate resulting from reprocessing spent nuclear fuel.

15. The method of claim 1 wherein said liquid radioactive waste is at least one selected from the group consisting of actinides and lanthanides.

16. The method of claim 1 wherein said liquid radioactive waste is at least one selected from the group consisting of cesium, strontium, and plutonium.

17. The method of claim 1 wherein said cenospheres in said porous glass crystalline molded block are non-magnetic.

18. The method of claim 1 wherein said cenospheres in said porous glass crystalline molded block are magnetic.

19. The method of claim 1 wherein said porous glass crystalline molded block comprises cenospheres of grain size −400+50 micrometers in diameter.

20. The method of claim 19 wherein said porous glass crystalline molded block comprises cenospheres of −160+100 micrometers in diameter.

21. The method of claim 1 wherein said porous glass crystalline molded block comprises a silicate glass binder.

22. The method of claim 21 further comprising hot pressing the calcined porous glass crystalline molded block loaded with said liquid waste after said calcining.

23. The method of claim 22 wherein said porous glass crystalline molded block has an open-cell porosity of 40–50 vol. % and interglobular voids of 20–60 micrometers, and said cenospheres comprise non-magnetic, non-perforated cenospheres of grain size −160+100 micrometers.

24. The method of claim 21 wherein said porous glass crystalline molded block has an open-cell porosity of 60–70 vol. % and interglobular voids of 20–60 micrometers, and said cenospheres comprise non-magnetic, perforated cenospheres of grain size −160+100 micrometers.

* * * * *